United States Patent
Xu et al.

(10) Patent No.: US 10,082,956 B2
(45) Date of Patent: Sep. 25, 2018

(54) METHOD AND APPARATUS FOR DOWNLOADING DATA INCLUDING A PROGRESS BAR INDICATING PROGRESS OF DOWNLOADING

(71) Applicant: Beijing Kingsoft Network Technology Co., Ltd., Beijing (CN)

(72) Inventors: Youchun Xu, Beijing (CN); Baoliang Zhang, Beijing (CN); Dingpan Li, Beijing (CN)

(73) Assignee: Beijing Cheetah Network Technology Co., Ltd., Beijing (CN)

( * ) Notice: Subject to any disclaimer, the term of this patent is extended or adjusted under 35 U.S.C. 154(b) by 0 days.

(21) Appl. No.: 15/125,794

(22) PCT Filed: Feb. 5, 2015

(86) PCT No.: PCT/CN2015/072325
§ 371 (c)(1),
(2) Date: Sep. 13, 2016

(87) PCT Pub. No.: WO2015/135404
PCT Pub. Date: Sep. 17, 2015

(65) Prior Publication Data
US 2017/0003885 A1    Jan. 5, 2017

(30) Foreign Application Priority Data

Mar. 14, 2014  (CN) .......................... 2014 1 0095378

(51) Int. Cl.
G06F 13/00    (2006.01)
G06F 3/06     (2006.01)
G06F 17/30    (2006.01)

(52) U.S. Cl.
CPC ............ *G06F 3/0604* (2013.01); *G06F 3/064* (2013.01); *G06F 3/0673* (2013.01); *G06F 17/30138* (2013.01)

(58) Field of Classification Search
CPC ...... G06F 9/3816; G06F 12/109; G06F 12/02; G06F 12/06; G06F 9/355
(Continued)

(56) References Cited

U.S. PATENT DOCUMENTS 7,956,847 B2 *  6/2011  Christie .................. G06F 3/044
                                                              345/173
8,776,227 B1 *  7/2014  Glick .................... G06F 21/566
                                                              726/23
(Continued)

FOREIGN PATENT DOCUMENTS

CN      101447994 A    6/2009
CN      101252600 A    1/2014
(Continued)

OTHER PUBLICATIONS

International Search Report, dated Mar. 19, 2015, from corresponding International Application No. PCT/CN2015/072325.

*Primary Examiner* — Sean D Rossiter
(74) *Attorney, Agent, or Firm* — Wolf, Greenfield & Sacks, P.C.

(57) ABSTRACT

A method and apparatus for downloading data. The method comprises: dividing a storage space for storing data into multiple storage subspaces in advance; if it is determined that a download progress bar is dragged from a first position to a second position, obtaining an offset of a download position; determining, according to the offset of the download position and the size of the storage subspaces, a selected storage subspace and an invalid data area in the selected storage subspace; and filling the invalid data area and writing, starting from the second position, the data into (Continued)

the selected storage subspace. By using the method and apparatus thereof, a filling space for storing data can be reduced, thereby improving the data downloading speed, and improving use experience of a user.

8 Claims, 2 Drawing Sheets

(58) Field of Classification Search
USPC .................................. 711/201, 209, 219, 220
See application file for complete search history.

(56) References Cited

U.S. PATENT DOCUMENTS

| | | | | |
|---|---|---|---|---|
| 9,779,165 | B2* | 10/2017 | Lee | .................... G06F 17/30852 |
| 2009/0240833 | A1* | 9/2009 | Zhang | ..................... H04L 12/66 |
| | | | | 709/236 |
| 2016/0357493 | A1* | 12/2016 | Zerwas | ................. G06F 3/1438 |

FOREIGN PATENT DOCUMENTS

| CN | 103546813 A | 1/2014 |
|---|---|---|
| CN | 103902337 A | 7/2014 |

* cited by examiner

METHOD AND APPARATUS FOR DOWNLOADING DATA INCLUDING A PROGRESS BAR INDICATING PROGRESS OF DOWNLOADING

CROSS REFERENCE TO RELATED APPLICATIONS

This application is the national phase of international Application No. PCT/CN2015/072325, titled "Method and apparatus for downloading data", filed on Feb. 5, 2015, which-claims the priority of a Chinese patent application No. 201410095378.4 filed before Chinese Patent Office on Mar. 14, 2014, entitled "Method and apparatus for downloading data", which applications are hereby incorporated by reference to the maximum extent allowable by law.

TECHNICAL FIELD

The present application generally relates to the field of electronic technology, and in particular to a method and apparatus for downloading data.

BACKGROUND ART

With the development of science and technology, electronic devices, such as smart phones, laptops, etc., have been widely used in daily life. A user can watch various videos online through a browser installed in an electronic device, and even download these video.

During the video download process, a download progress bar may be dragged into a rear position by a user. In this case, it is possible to continue downloading the video data starting from the current position since the skipped areas produced by the user's drag operation need to be filled with invalid data (hereinafter briefly referred to as "invalid data area"). When the skipped areas produced by dragging video files are large the space of invalid data areas is very large, affecting the speed for downloading video data.

SUMMARY OF INVENTION

Embodiments of the present application provide a method and apparatus for downloading data. By applying the embodiments of the present application, a filling space of the invalid data can be reduced, thereby improving data downloading speed and improving use experience of a user.

Embodiments of the present application provide a method for downloading data, which comprises:

dividing a storage space for storing data plurality of storage subspaces in advance, wherein the storage subspaces have the same size;

obtaining a download position offset if it is determined that a download progress bar is dragged from a first position to a second position;

determining a selected storage subspace and an invalid data area in the selected storage subspace according to the download position offset and the size of the storage subspaces; and filling the invalid data area and writing, starting from the second position, the data into the selected storage subspace.

Wherein, the step of dividing a storage space storing data into a plurality of storage subspaces in advance comprises:

selecting an appropriate size to divide the storage space for storing the data in accordance with the length of download data.

Wherein, the step of determining a selected storage subspace and an invalid data area in the selected storage subspace according to the download position offset and the size of the storage subspaces comprises:

calculating an index number of the selected storage subspace and length of the invalid data area in the selected storage subspace according to the obtained download position offset and the size of the storage subspaces.

Wherein, the step of calculating an index number of the selected storage subspace and length of the invalid data area in the selected storage subspace according to the obtained download position offset and the size of the storage subspaces comprises:

dividing the download position offset by the size of the storage subspaces, and obtaining the calculated quotient and remainder;

obtaining the index number of the selected storage subspace in accordance with the quotient and taking the remainder as the length of the invalid data area in the selected storage subspace.

Accordingly, embodiments of the present application provide an apparatus for downloading data, which comprises:

a storage space division module for dividing a storage space for storing data into a plurality of storage subspaces in advance, wherein the storage subspaces have the same size;

an offset obtaining module for obtaining a download position offset, if it is determined that a download progress bar is dragged from a first position to a second position;

a space selection module for determining a selected subspace and an invalid data area in the selected storage subspace according to the download position offset and the size of the storage subspaces;

a data filling and writing module for filling the invalid data area and writing, starting from the second position, the data into the selected storage subspace.

Wherein, the storage space division module comprises:

a size selection and division unit for selecting an appropriate size to divide the storage space for storing the data in accordance with the length of download data.

Wherein, the space selection module comprises:

a calculation unit for calculating an index number of the selected storage subspace and length of the invalid data area in the selected storage subspace according to the obtained download position offset and the size of the storage subspaces.

Wherein, the calculation unit comprises:

a division calculation subunit for dividing the download position offset by the size of the storage subspaces and obtaining the calculated quotient and remainder;

a value determination subunit obtaining the index number of the selected storage subspace in accordance with the quotient and taking the remainder as the length of the invalid data area in the selected storage subspace.

Embodiments of the present application also provide a storage medium, wherein the storage medium is used for storing application programs, which are used for performing the method for downloading data provided by the foregoing embodiments of the present application when executed; wherein the method for downloading data provided by the foregoing embodiments of the present application comprises the following steps:

dividing a storage space for storing data into a plurality of storage subspaces in advance, wherein the storage subspaces have the same size;

obtaining a download position offset if it is determined that a download progress bar is dragged from a first position to a second position;

determining a selected storage subspace and an invalid data area in the selected storage subspace according to the download position offset and the size of the storage subspaces; and filling the invalid data area and writing, starting from the second position, the data into the selected storage subspace.

Embodiments of the present application also provide an application program, wherein the application program is used for performing the method for downloading data provided by the foregoing embodiments of the present application when executed; wherein the method for downloading data provided by the foregoing embodiments of the present application comprises the following steps:

dividing a storage space for storing data into a plurality of storage subspaces in advance, wherein the storage subspaces have the same size;

obtaining a download position offset if it is determined that a download progress bar is dragged from a first position to a second position;

determining a selected storage subspace and an invalid data area in the selected storage subspace according to the download position offset and the size of the storage subspaces; and filling the invalid data area and writing, starting from the second position, the data into the selected storage subspace.

Embodiments of the present application also provide an user device, which comprises:

a processor, a memory, communication interfaces and a bus;

the processor, the memory and the communication interfaces are connected and communicated with each other via the bus;

the memory stores executable program codes;

the processor runs a program corresponding to the executable program codes by reading the executable program codes stored in the memory, in order to be used for:

dividing a storage space for storing data into a plurality of storage subspaces in advance, wherein the storage subspaces have the same size;

obtaining a download position offset if it is determined that a download progress bar is dragged from a first position to a second position;

determining a selected storage subspace and an invalid data area in the selected storage subspace according to the download position offset and the size of the storage subspaces; and filling the invalid data area and writing, starting from the second position, the data into the selected storage subspace.

Embodiments of the present application also provide an electronic equipment for downloading data, comprising: a housing, a processor, a memory, a circuit board and a power circuit, wherein the circuit board is arranged in inner space enclosed by the housing, the processor and the memory are arranged on the circuit board; the power circuit is used to provide power supply to various circuits or device on the electronic equipment; the memory is used to store executable program code; the processor runs a program corresponding to the executable program code by reading the executable program code stored in the memory to perform the following steps:

dividing a storage space for storing data into a plurality of storage subspaces in advance, wherein the storage subspaces have the same size;

obtaining a download position offset if it is determined that a download progress bar is dragged from a first position to a second position;

determining a selected subspace and an invalid data area in the selected storage subspace according to the download position offset and the size of the storage subspaces; and filling the invalid data area and writing, starting from the second position, the data into the selected storage subspace.

By implementing the embodiments of the present application, which comprise dividing a storage space for storing data into a plurality of storage subspaces in advance, wherein the storage subspaces have the same size; obtaining a download position offset if it is determined that a download progress bar is dragged from a first position to a second position; determining, according to the download position offset and the size of the storage subspaces, a selected storage subspace and an invalid data area in the selected storage subspace; and filling the invalid data area and writing, starting from the second position, the data into the selected storage subspace, a filling space of the invalid data is reduced, thereby improving data downloading speed and improving use experience of a user.

BRIEF DESCRIPTION OF DRAWINGS

In order to describe the technical solutions in the embodiments of the present application more clearly, appended drawings required for describing the embodiments of the present application will be briefly described below. Obviously, the appended drawings described below are for some embodiments of the present application, and those skilled in the art can obtain other drawings based on these drawings without doing creative works.

DETAILED DESCRIPTION OF EMBODIMENTS

Technical solutions in the embodiments of the present application will be described below clearly and completely in combination with the appended drawings of the embodiments of the present application. Obviously, the described embodiments are some of the embodiments of the present application, rather than all of the embodiments. Any other embodiment obtained based on the embodiments of the present application by those skilled in the art without doing creative works falls into the protection scope of the present application.

Figure 1:
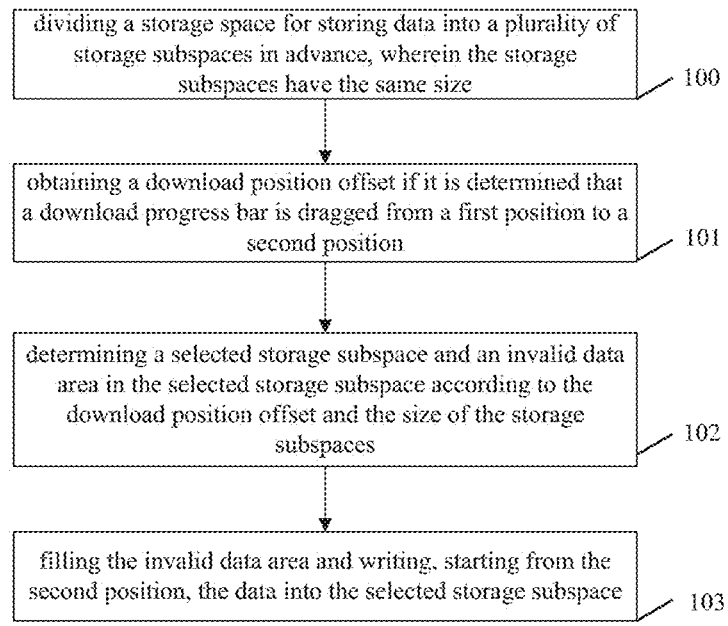
FIG. 1 is a flowchart of a first embodiment of a method for downloading data provided by the present application.

Referring to FIG. 1, it shows a flowchart of a first embodiment of a method for downloading data provided by the present application. The method comprises the following steps.

In S100, a storage space for storing, data into plurality of storage subspaces is divided in advance, wherein the storage subspaces have the same size.

Optionally, it is possible to select an appropriate size to divide the storage space for storing the above data (hereinafter briefly referred to as "storage space") in accordance with the length of download data.

In S101, a download position offset is obtained if it is determined that a download progress bar is dragged from a first position to a second position.

In a specific implementation, during a process of data downloading, if it is determined that a download progress bar is dragged from a first position to a second position, it can be determined that in the above storage space, the data writing position is changed, and the download position offset is the length from the starting position (0M) to the second position of the data.

It is noted that the first position may be the above-mentioned starting position, while it may also be other than the above-mentioned starting position.

In S102, a selected storage subspace and an invalid data area in the selected storage subspace are determined according to the download position offset and the size of the above-mentioned storage subspaces, wherein the selected storage subspace is a storage subspace for storing the data starting from the above-mentioned second position.

Optionally, it is possible to calculate an index number of the selected storage subspace and length of the invalid data area in the selected storage subspace according to the obtained download position offset and the size of the storage subspaces.

For example, it is possible to divide the download position offset by the size of the storage subspaces, thereby obtaining a quotient and a remainder; it is then possible to obtain the index number of the selected storage subspace in accordance with the quotient, and the remainder is the length of the invalid data area in the selected storage subspace.

Taking video download as an example, when a user is downloading a video, if a download progress bar is dragged from the 0M position (the first position) to the 10M position (the second position), and the storage space for storing download video is divided into several storage subspaces whose sizes are 8M, wherein the index numbers of these storage subspaces are 0, 1, 2, 3, etc. in sequence. In this example, the download position offset of 10M is divided by the size of the storage subspaces 8M, thereby obtaining a quotient of 1 and a remainder of 2. Therefore, it is possible to determine that, starting from the 10M position, the download video should be stored in the storage subspace (the selected storage subspace) with the index number of 1, wherein the length of the invalid data area is 2M. Thus, the download video should be stored in the storage subspace with the index number of 1 from the starting position to the 2M position.

In this example, if the download progress bar is dragged again to the other position, for example, from the 12M position (the first position) to the 25M position (the second position), then according to the above-mentioned method, the download position offset is 25M. Since the size of the storage subspaces is 8M, it can be determined that the download data at the 25M position should be written in the storage subspace with the index number of 3, and the length of the invalid data area in the storage subspace with the index number of 3 is 1M.

In S103, the invalid data area is filled and the data is written into the selected storage subspace, starting from the second position.

In the embodiments of the present application, a download position offset is obtained by determining that a download progress bar is dragged from a first position second position, thereby determining a selected storage subspace and an invalid data area in the selected storage subspace according to the download position offset and the size of the storage subspaces, and finally the invalid data area is filled and the data is written, starting from the second position, into the selected storage subspace. By applying the embodiments of the present application, a filling space for storing data can be reduced, thereby improving data downloading speed, and improving use experience of a user.

Figure 2:
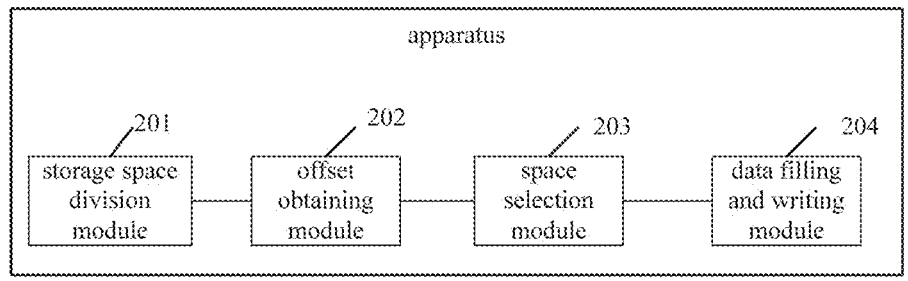
FIG. 2 is a schematic structural diagram of an apparatus for downloading data provided by the present application.

Referring to FIG. 2, a schematic structural diagram of the apparatus for downloading data provided by the present application is shown. As shown, the apparatus in the embodiment of the present application at least comprises:

a storage space division module 201, which is used for dividing a storage space for storing data into a plurality of storage subspaces in advance, wherein the storage subspaces have the same size;

an offset obtaining module 202, which is used for obtaining a download position offset if it is determined that a download progress bar is dragged from a first position to a second position; and a space selection module 203, which is used for determining a selected storage subspace and an invalid data area in the selected storage subspace according to the download position offset and the size of the storage subspaces, wherein the selected storage subspace is a storage subspace for storing the data starting from the above-mentioned second position.

Figure 3:
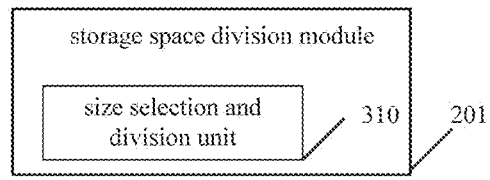
FIG. 3 is a schematic structural diagram of a storage space division module of the apparatus for downloading data provided by the present application.

Optionally, as shown in FIG. 3, the storage space division module 201 may comprise:

a size selection and division unit 310, which is used for selecting an appropriate size to divide the storage space for storing the data in accordance with the length of download data.

Figure 4:
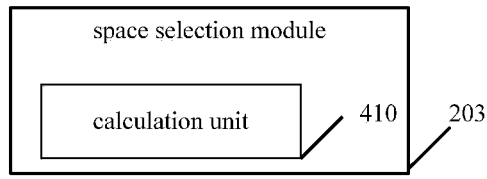
FIG. 4 is a schematic structural diagram of a space selection module of the apparatus for downloading data provided by the present application.

Optionally, as shown in FIG. 4, the space selection module 203 may comprise:

a calculation unit 410, which is used for calculating the index number of the selected storage subspace and the length of the invalid data area in the selected storage subspace according to the obtained download position offset and the size of the storage subspaces.

Figure 5:
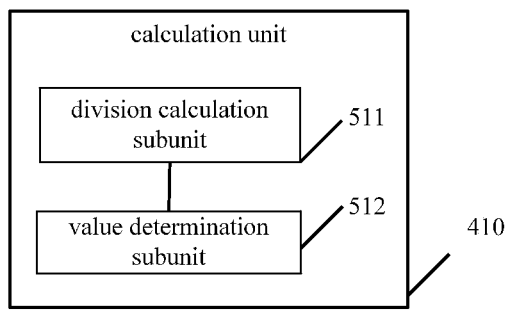
FIG. 5 is a schematic structural diagram of a calculation unit of the space selection module provided by the present application.

Furthermore, as shown in FIG. 5, the calculation unit 410 may comprise:

a division calculation subunit 511, which is used for dividing the download position offset by the size of the storage subspaces and obtaining the calculated quotient and remainder; and a value determination subunit 512, which is used for obtaining the index number of the selected storage subspace in accordance with the quotient and taking the remainder as the length of the invalid data area in the selected storage subspace.

Taking video download as an example, when a user is downloading a video, if a download progress bar is dragged from the 0M position (the first position) to the 10M position (the second position), and the storage space for storing download video is divided into several storage subspaces with size of 8M, wherein index numbers of these storage subspaces are 0, 1, 2, 3, etc. in sequence. In this example, the download position offset of 10M is divided by the size of the storage subspaces 8M, thereby obtaining a quotient of 1 and a remainder of 2. Therefore, it is possible to determine that, starting from the 10M position, the download video should be stored in the storage subspace (the selected storage subspace) with the index number of 1, wherein the length of the invalid data area is 2M. Thus, the download video should be stored in the storage subspace with the index number of 1 from the starting position to the 2M position.

In this example, if the download progress bar is dragged again to the other position, for example, from the 12M position (the first position) to the 25M position (the second position), then according to the above-mentioned method, the download position offset is 25M. Since the size of the storage subspaces is 8M, it can be determined that the download data at the 25M position should be written in the storage subspace with the index number of 3, and the length of the invalid data area in the storage subspace with the index number of 3 is 1M.

A data filling and writing module 204 is used for filling the invalid data area and writing, starting from the second position, the data into the selected storage subspace.

In the embodiments of the present application, a download position offset is obtained by determining that a download progress bar is dragged from a first position to a second position, thereby determining a selected storage subspace and an invalid data area the selected storage subspace according to the download position offset and the size of the storage subspaces, and finally the invalid data area is filled and the data is written, starting from the second position, into the selected storage subspace. By applying the embodiments of the present application, a filling space for storing data can be reduced, thereby improving data downloading speed, and improving use experience of a user.

Embodiments of the present application also provide a storage medium, wherein the storage medium is used for storing application programs, which are used for performing the method for downloading data provided by the foregoing embodiments of the present application when running; wherein the method for downloading data provided by the foregoing embodiments of the present application comprises the following steps:

dividing a storage space for storing data into a plurality of storage subspaces in advance, wherein the storage subspaces have the same size;

obtaining a download position offset if it is determined that a download progress bar is dragged from a first position to a second position;

determining a selected storage subspace and an invalid data area in the selected storage subspace according to the download position offset and the size of the storage subspaces; and filling the invalid data area and writing, starting from the second position, the data into the selected storage subspace.

Embodiments of the present application also provide an application program, wherein the application program is used for carrying out the method for downloading data provided by the foregoing embodiments of the present application when executed; wherein the method for downloading data provided by the foregoing embodiments of the present application comprises the following steps:

dividing a storage space for storing data into a plurality of storage subspaces in advance, wherein the storage subspaces have the same size;

obtaining a download position offset if it is determined that a download progress bar is dragged from a first position to a second position;

determining a selected storage subspace and an invalid data area in the selected storage subspace according to the download position offset and the size of the storage subspaces; and filling the invalid data area and writing, starting from the second position, the data into the selected storage subspace.

Embodiments of the present application also provide an user device, which comprises:

a processor, a memory, communication interfaces and a bus;

the processor, the memory and the communication interfaces are connected and communicated with each other via the bus;

the memory stores executable program codes;

the processor carries out a program corresponding to the executable program codes by reading the executable program codes stored in the memory, in order to perform the following operations:

dividing a storage space for storing data into a plurality of storage subspaces in advance, in the storage subspaces have the same size;

obtaining download position offset if it is determined a download progress bar is dragged from a first position to a second position;

determining a selected storage subspace and an invalid data area in the selected storage subspace according to the download position offset and the size of the storage subspaces; and filling the invalid data area and writing, starting from the second position, the data into the selected storage subspace.

Figure 6:
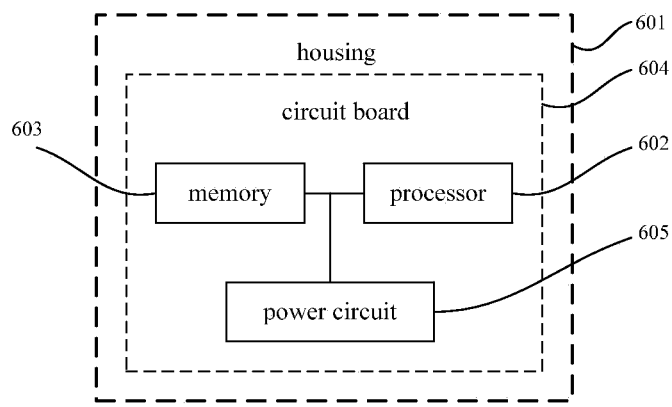
FIG. 6 is a schematic structural diagram of an electronic equipment for downloading data provided by the present application.

Further, embodiments of the present application also provide an electronic equipment for downloading data. As shown in FIG. 6, the electronic equipment comprises: a housing 601, a processor 602, a memory 603, a circuit board 604 and a power circuit 605, wherein the circuit board 604 is arranged in an inner space enclosed by the housing 601, the processor 602 and the memory 603 are arranged on the circuit board 604; the power circuit 605 is used to provide power supply to respective circuits or devices of the electronic equipment; the memory 603 is used to store executable program code; the processor 602 runs a program corresponding to the executable program code by reading the executable program code stored in the memory 603 to perform the following steps:

dividing a storage space for storing data into a plurality of storage subspaces in advance, wherein the storage subspaces have same size;

obtaining a download position offset if it is determined that a download progress bar is dragged from a first position to a second position;

determining a selected subspace and an invalid data area in the selected storage subspace according to the download position offset and the size of the storage subspaces; and filling the invalid data area and writing, starting from the second position, the data into the selected storage subspace.

The steps in the method embodiments of the present application can be reordered, merged and deleted.

The modules or units in the apparatus embodiments of the present application can be merged, divided and deleted according to actual needs.

The modules or units in the apparatus embodiments of the present application can be implemented by a general integrated circuit such as a Central Processing Unit (CPU), or by an Application Specific Integrated Circuit (ASIC).

It may be understood by those ordinary skilled in the art that, all or part of the steps in the foregoing method embodiments can be achieved by instructing relevant hardware by a computer program, the program may be stored in a computer readable storage medium, and can include the steps in the foregoing method embodiments when executed, wherein the storage medium may be a magnetic disc, an optical disc, a read-only memory (ROM) or a random access memory (RAM) and so on.

The above disclosed embodiments are only the preferred ones of the present application, which cannot be used to limit the scope of the claims of the present application, as a result, equivalent alterations made in accordance with the claims of the present application still fall into the scope of the present application.

What is claimed is:

1. A method for downloading data, characterized in that the method comprises:
   dividing a storage space for storing data into a plurality of storage subspaces in advance, wherein the storage subspaces have the same size;
   obtaining a download position offset if it is determined that a download progress bar is dragged from a first position to a second position;
   determining a selected storage subspace and an invalid data area in the selected storage subspace according to the download position offset and the size of the storage subspaces; and
   filling the invalid data area and writing, starting from the second position, the data into the selected storage subspace;
   wherein the download progress bar is a progress bar that indicates the progress of downloading;
   wherein the download position offset is the length from a starting position to the second position of the data.

2. The method of claim 1, characterized in that the step of dividing a storage space for storing data into a plurality of storage subspaces in advance comprises:
   selecting an appropriate size to divide the storage space for storing the data in accordance with the length of download data.

3. The method of claim 1, characterized in that the step of determining a selected storage subspace and an invalid data area in the selected storage subspace according to the download position offset and the size of the storage subspaces comprises:
   calculating an index number of the selected storage subspace and length of the invalid data area in the selected storage subspace according to the obtained download position offset and the size of the storage subspaces.

4. The method of claim 3, characterized in that the step of calculating an index number of the selected storage subspace and length of the invalid data area in the selected storage subspace according to the obtained download position offset and the size of the storage subspaces comprises:
   dividing the download position offset by the size of the storage subspaces, and obtaining the calculated quotient and remainder; and
   obtaining the index number of the selected storage subspace in accordance with the quotient and taking the remainder as the length of the invalid data area in the selected storage subspace.

5. An electronic equipment for downloading data, characterized in that the equipment comprises: a housing, a processor, a memory, a circuit board and a power circuit, wherein the circuit board is arranged in an inner space enclosed by the housing, the processor and the memory are arranged on the circuit board; the power circuit is used to provide power supply to respective circuits or devices of the electronic equipment; the memory is used to store executable program code; the processor runs a program corresponding to the executable program code by reading the executable program code stored in the memory to perform the following steps:
   dividing a storage space for storing data into a plurality of storage subspaces in advance, wherein the storage subspaces have the same size;
   obtaining a download position offset if it is determined that a download progress bar is dragged from a first position to a second position;
   determining a selected subspace and an invalid data area in the selected storage subspace according to the download position offset and the size of the storage subspaces; and
   filling the invalid data area and writing, starting from the second position, the data into the selected storage subspace;
   wherein the download progress bar is a progress bar that indicates the progress of downloading;
   wherein the download position offset is the length from a starting position to the second position of the data.

6. The electronic equipment of claim 5, characterized in that the processor runs a program corresponding to the executable program code by reading the executable program code stored in the memory to further perform the following step:
   selecting an appropriate size to divide the storage space for storing the data in accordance with the length of download data.

7. The electronic equipment of claim 5, characterized in that the processor runs a program corresponding to the executable program code by reading the executable program code stored in the memory to further perform the following step:
   calculating an index number of the selected storage subspace and length of the invalid data area in the selected storage subspace according to the obtained download position offset and the size of the storage subspaces.

8. The electronic equipment of claim 7, characterized in that the processor runs a program corresponding to the executable program code by reading the executable program code stored in the memory to further perform the following steps:
   dividing the download position offset by the size of the storage subspaces and obtaining the calculated quotient and remainder; and
   obtaining the index number of the selected storage subspace in accordance with the quotient and taking the remainder as the length of the invalid data area in the selected storage subspace.

* * * * *